Jan. 12, 1926.  1,569,299
E. F. PRESTON
OPEN POTENTIAL CIRCUIT DETECTOR
Filed Jan. 13, 1922   2 Sheets-Sheet 1

Inventor:
E. F. PRESTON,
By Monroe E. Miller
Attorney.

Jan. 12, 1926. 1,569,299
E. F. PRESTON
OPEN POTENTIAL-CIRCUIT DETECTOR
Filed Jan. 13, 1922 2 Sheets-Sheet 2
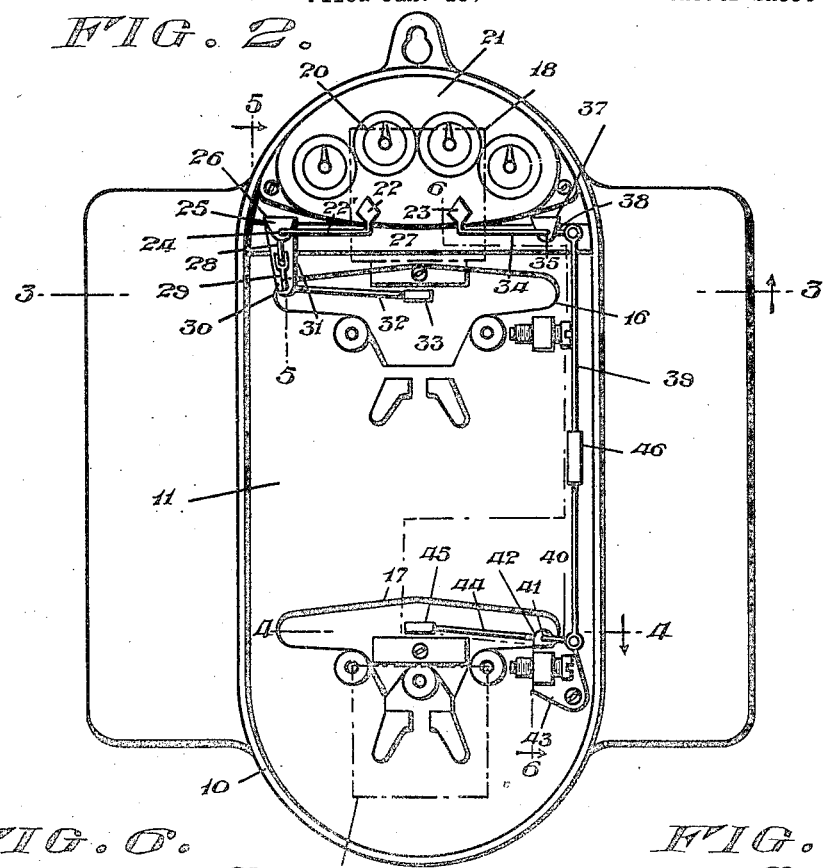
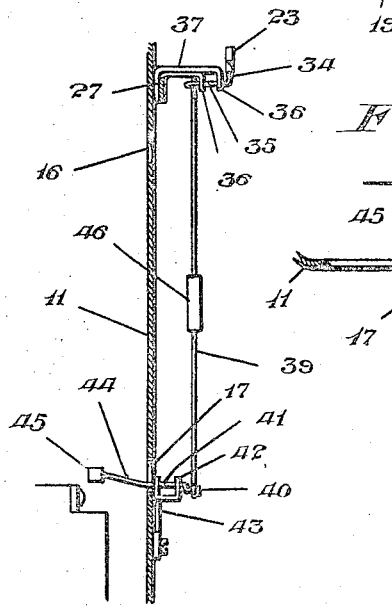
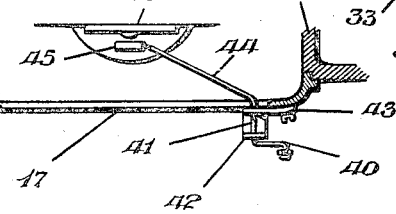
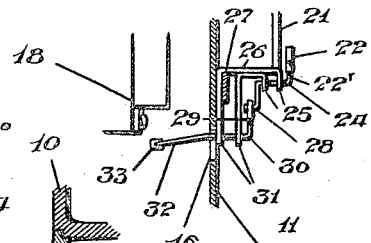
Inventor:
E. F. PRESTON,
By Monroe E. Miller
Attorney.

Patented Jan. 12, 1926.

1,569,299

UNITED STATES PATENT OFFICE.

ELIAS F. PRESTON, OF MASON CITY, IOWA.

OPEN-POTENTIAL-CIRCUIT DETECTOR.

Application filed January 13, 1922. Serial No. 529,054.

*To all whom it may concern:*

Be it known that I, ELIAS F. PRESTON, a citizen of the United States, residing at Mason City, in the county of Cerro Gordo and State of Iowa, have invented certain new and useful Improvements in Open-Potential-Circuit Detectors, of which the following is a specification, reference being had therein to the accompanying drawing.

The present invention relates to a device for detecting or indicating the opening of the circuit of a potential coil of an electric meter, and aims to provide a novel and improved contrivance of that character.

It not infrequently happens that one potential coil of an electric meter will burn out or the circuit thereof become opened, due to lightning or other causes, resulting in the meter still registering the current passing through the remaining coil or element, although only a fraction of the full amount of current passing through the meter. These and similar conditions have been known to exist for months until the meters are tested, resulting in financial losses to the companies supplying the electric current. The present invention contemplates the combination with any type or style of electric meter, of means for detaching or indicating when one or more of the circuits of the potential coils are opened for any cause whatever, in order that the defect will be promptly noticed so that same can be remedied, with minimum loss, inasmuch as the meter reader would observe the indication or detection signal given by the device without the meter being tested.

A further object of the invention is the provision of such a device associated with an electric meter including indicating means and a magnetic member or armature associated with each potential coil of the meter, whereby when the coil is energized, the armature is drawn toward the coil by the magnetic flux, thereby retracting or withdrawing the indicating means, whereas when the circuit of the coil is opened, the armature is moved away from the coil, thereby bringing the indicating means to position for observation, in order that a person looking at the meter would be immediately notified of the fact that one of the coils has become dead.

It is also an object of the invention to provide such a device which is simple and inexpensive in construction, which can be readily incorporated or installed on different types of meters, and which will be thoroughly practical and reliable in use.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a similar view with the disks, magnets and other parts removed, showing the detecting devices in indicating position as when the potential coils are dead.

Figs. 4, 5 and 6 are sectional details taken on the respective lines, 4—4, 5—5 and 6—6 of Fig. 2.

Figure 1:
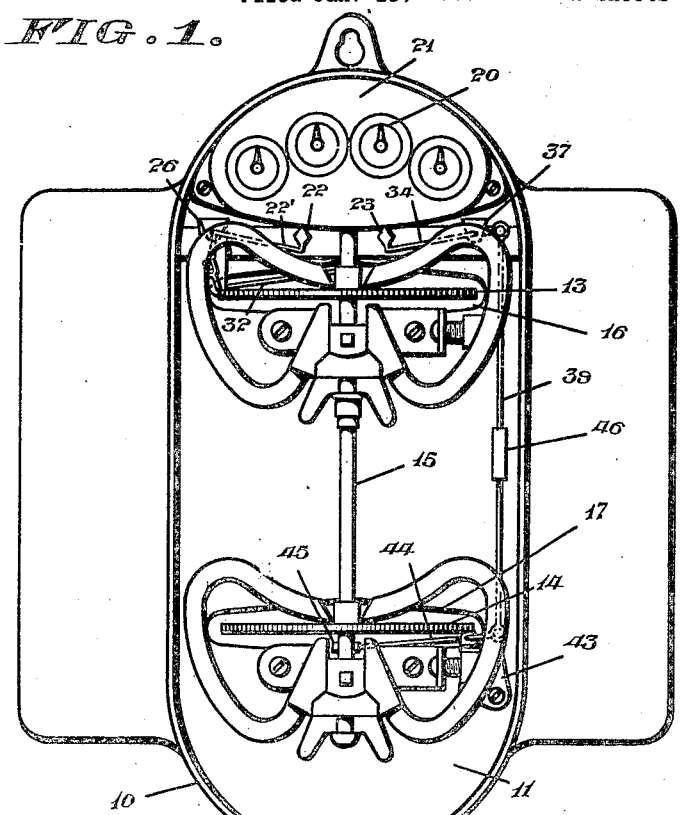
Figure 1 is a front view of an electric meter showing the front cover or wall removed and the detecting or indicating devices installed and in normal position.
Figure 3:
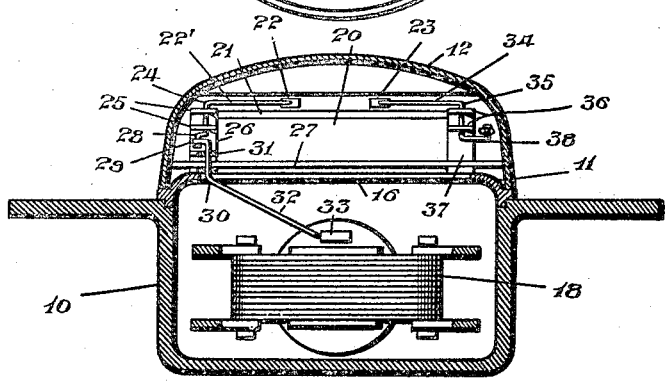
Fig. 3 is a horizontal section on the line 3—3 of Fig. 2.

The invention is shown as incorporated in a conventional or well-known type of meter, and can be used in other single phase or polyphase electric meters also, having one or more potential coils which are normally energized whether or not current is being used by the consumer. The meter illustrated comprises the vertical casing 10 having the partition 11 between the front and back walls, and having the front cover or wall 12. Vertically-spaced disks 13 and 14 are mounted on a vertical shaft 15 which is journaled for rotation in front of the partition 11 and behind the cover 12, and said disks project rearwardly through horizontal slots 16 and 17, respectively, in said cover 11, for cooperation with the usual potential coils or elements 18 and 19 disposed within the casing 10 behind said partition. The meter includes a register 20 with which the upper end of the shaft 15 is connected, for indicating the total current consumed, and said register has a face 21 which is normally exposed through a window (not shown) in the cover or front wall 12.

In carrying out the invention, a detector or indicator is used with each potential coil of the meter, and in the arrangement shown, there are two indicating or signal members 22 and 23 for the respective coils 18 and 19, and said members may be colored red or otherwise rendered prominent, when exposed, to attract attention thereto. Said signal or indicating members are normally retracted or withdrawn from view, when the coils are energized, and are only moved to indicating position or into position for observation, when the coils are deenergized. The signal or indicating members are thus automatically controlled by the energization and deenergization of the potential coils, and this automatic control of the indicating means can be accomplished in different ways.

One preferred arrangement is shown for operating the signal or indicating members. Thus, the indicating member 22 is mounted on the end of an arm 22' disposed immediately below the face 21 of the register, and carried by the forward end of a short shaft 24 journaled in ears or bearings 25 depending from a forwardly-projecting bracket 26 secured to a transverse bar 27 which is secured across the partition 11 above the slot 16. The shaft 24 has a depending crank arm 28 at its rear end engaging a slotted arm 29 upstanding from the forward end of a second rock shaft 30 which is journaled through hangers 31 depending from the bracket 26 in rear of the ears or bearings 25. The rear end of the shaft 30 has an arm 32 extending through the slot 16 and carrying an armature or magnetic member 33 movable adjacent to the pole or other portion of the potential coil 18. The armature 33 is of iron or other magnetic material and the other parts are preferably of brass or other non-magnetic material. The arrangement is such, that when the coil 18 is energized, the armature 33 is drawn upwardly by the magnetic flux toward the coil 18, thereby swinging the arm 29 outwardly, and swinging the arm 28 of the rock shaft 24 likewise, and swinging the arm 22' downwardly so as to remove the indicating member 22 from the face 21 of the register, as seen in Fig. 1. If the coil 18 becomes dead or deenergized, the armature 33 is released, and will move away from the coil by gravity (although the movement can be assisted by a suitable spring), which will, through the arms 29 and 28 raise the arm 22' and indicating member 22, so that said member projects upwardly in front of the register face 21, as seen in Fig. 2, for indicating or signalling that the coil 18 is dead.

A somewhat similar arrangement is used for the other indicating member 23, in the form of the invention as shown. Thus, the member 23 is mounted on the end of an arm 34 below the face 21. The arms 22' and 34 project toward one another from the opposite sides of the meter, and the arm 34 is carried by the forward end of a short rock shaft 35 journaled in ears or bearings 36 depending from a bracket 37 secured to the transverse bar 27 near that end opposite to the bracket 26. The shaft 35 has an arm 38 at its rear end to which the upper end of a vertical link or rod 39 is connected, and the lower end of said link or rod is connected to an arm 40 on the forward end of a lower rock shaft 41 journaled in a bracket 42 carried by a plate or clip 43 secured to the partition 11 below one end of the slot 17. The rear end of the shaft 41 has an arm 44 projecting through said slot 17 and carrying an armature or magnetic member 45 working adjacent to the pole or other portion of the lower potential coil 19. Thus, when the coil 19 is energized, the armature 45 is drawn downwardly toward the coil 19, thereby raising the link 39 and swinging the arm 34 downwardly to retract or move the indication member 23 from view, as seen in Fig. 1. When the coil 18 is deenergized, the armature 45 is released, and will swing upwardly away from the coil, whereby the rod or link 39 moving downwardly will raise the arm 34 and member 23, as seen in Fig. 2, for indicating or signalling that the lower potential coil is dead. As shown, a weight 46 is secured on the rod or link 39, for moving the member 23 to indicating position when the coil 19 becomes dead, although a spring or other equivalent means can be used. The armature 45, similar to the armature 33, is of iron, but the arm 44, link 39 and other parts are of brass or other non-magnetic material.

The rock shafts, brackets, and other parts of the operative connections between the armatures and indicating members are disposed in front of and are supported from the partition 11, with the arms 32 and 44 extending rearwardly through the corresponding slots 16 and 17 to bring the armatures adjacent to the corresponding potential coils.

With the present devices installed in the meter, the signal or indicating members are normally retracted from view when the coils are energized, and should either or both of the coils become dead by the opening of the circuit or circuits in any manner, the corresponding signal or indicating member, or both of them, will move to indicating or signalling position so as to be quickly noticed by a person looking at the meter. In thus indicating or detecting the fact that one or more of the potential coils are deenergized, the fault will be noticed by the meter reader or inspector, so that the defect can be remedied without serious loss of current to the producer. The device is also extremely simple and can be readily embodied in different kinds of meters with equal success and propriety.

Having thus described the invention, what is claimed as new is:—

In combination, in an electric meter; a casing, a partition within the casing having an opening, a potential coil behind said partition in the casing, a register within the casing having a face exposed to view in front of said partition, bearings secured to said partition at the front side thereof, rock shafts journaled in said bearings and each having an arm, a signal member carried by one arm to be moved to a position in front of said face for observation, the other arm extending through said opening in rear of said partition, an armature carried by the last-named arm and arranged adjacent to said coil to be moved toward and away from the coil when the coil is energized and deenergized, respectively, and an operative connection between said shafts.

In testimony whereof I hereunto affix my signature.

ELIAS F. PRESTON.